UNITED STATES PATENT OFFICE.

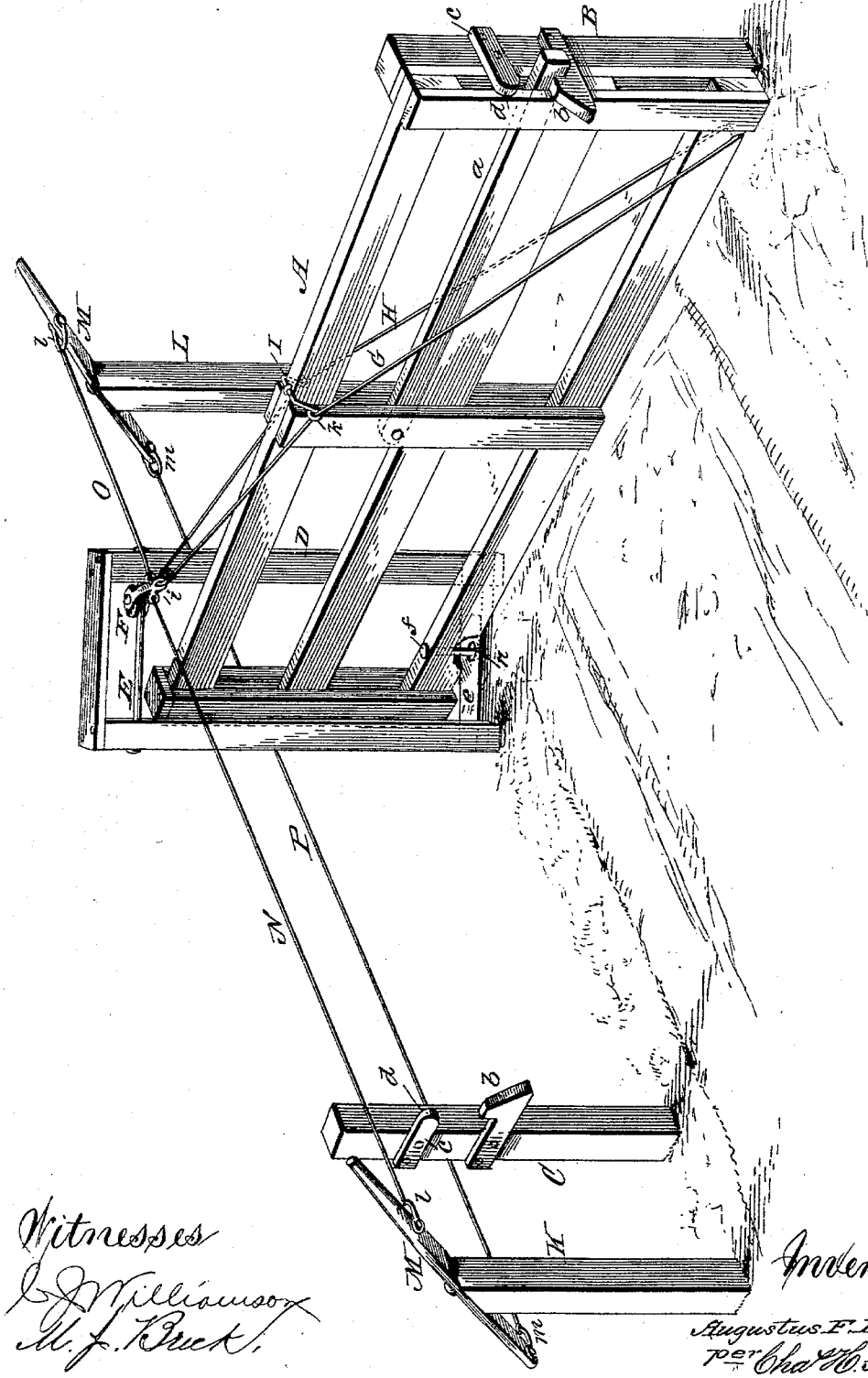

AUGUSTUS F. BRYA, OF CHAMPAIGN, ILLINOIS.

FARM-GATE.

SPECIFICATION forming part of Letters Patent No. 602,892, dated April 26, 1898.

Application filed February 5, 1898. Serial No. 669,213. (No model.)

*To all whom it may concern:*

Be it known that I, AUGUSTUS F. BRYA, a citizen of the United States, residing at Champaign, in the county of Champaign and State of Illinois, have invented certain new and useful Improvements in Farm-Gates; and I do hereby declare that the following is a full, clear, and exact description of the same, reference being had to the annexed drawing, making a part of this specification, and to the letters of reference marked thereon.

The present invention has relation to that class of swinging gates operated by pivoted levers upon either side thereof and connecting with the gate by suitable cords or wires and pulleys; and the object thereof is to provide a gate that will be easy of operation from either side thereof and that will automatically close or open and latch itself in either position.

The invention thereof consists in a swinging gate and means for operating the same, substantially as shown in the drawing and hereinafter described and claimed.

In the accompanying drawing, which represents a perspective view of the gate and means for operating it, A designates the gate, which may be of any suitable construction and provided with a suitable pivoted latch $a$. This latch is adapted to engage with a suitable keeper $b$ on either the post B or the post C to hold the gate closed or in an open position, the gate being shown as closed.

Connected to the posts, immediately above the keepers, are guards $c$, having their extended ends curved, as shown at $d$, to allow the end of the latch to engage automatically with the keeper, but prevent it from being accidentally disengaged.

A rectangular and upright frame D serves as a support for the inner end of the gate, the two uprights of the frame acting as stops against which the rear or inner post of the gate comes in contact when swung in either direction and also serving as braces to the inner end of the gate when in a closed or open position.

The gate, at or near its inner end, is pivoted in any suitable manner to the cross-beam $e$ of the frame, as shown at $f$, the pivotal pin extending through the lower rail of the gate and into the beam, so that it will form a pivot upon which the gate may swing in closing or opening the same.

At or near the upper end of the frame D is a horizontal transverse guide-rod E, with which engages a grooved pulley F, said pulley being connected to a suitable pulley-block $i$. This pulley-block has suitably connected to it the stay-rods G H, extending upon either side of the gate and through eyes $k$ at the ends of a hanger I, pivoted to the upper rail of the gate, said rods extending down at an angle to the front or outer end of the lower rail of the gate to which they are attached. These brace-rods may be formed of one continuous wire, as shown, or two separate wires, as found most desirable.

The pivoted hanger I holds the rods up in place at or near their center and adapts itself to the rods when the gate is swung in either direction and takes off the lateral strain on the hanger were the latter rigidly connected to the gate.

Upon either side of the gate are posts K L, which are beveled upon their upper ends, and to these bevel ends are pivoted hand-levers M, so that the levers will be at a slight incline to the posts, as shown in the drawing, thereby enabling the wires N O and the wire P to extend upon opposite sides of the upright frame D and insure their more perfect operation by the levers.

The two wires N O are connected at their inner ends to the pulley-block $i$, and their outer ends are connected to a clevis $l$ upon each of the levers M, near the handle end thereof.

The single wire P has its ends connected to a clevis $m$ upon the extremity of the levers M, the several clevises being pivotally connected to the levers for a perfect operation thereof.

It will be noticed that the upright frame D is not disposed at right angles to the gate when the latter is in a closed or open position, but, on the contrary, is at an acute angle thereto, so as to allow the uprights of the frame to act as stops to the rear or inner post of the gate when the gate is either in a closed or open position and also admit of the gate being swung around at right angles.

It will be further noticed that the pivotal pin $f$ simply rests in a socket $n$ in the cross-beam *e* of the frame D, so that there is no binding of the gate upon its pivotal connection, and it permits the gate to be elevated at its outer end to disengage the latch thereof with the keeper.

The gate being represented as in a closed position in the drawing, when the proper lever is operated the gate at its outer end will be elevated sufficiently to disengage the latch from the keeper, and this inclined position will cause the gate to swing around automatically or by gravity and engage the latch thereof with the keeper on the opposite post, and thereby hold the gate open, the same operation by the use of the opposite hand-lever closing the gate, as shown in the drawing.

Having now fully described my invention, what I claim as new, and desire to secure by Letters Patent, is—

A swinging gate, an upright frame to which said gate is pivoted and disposed at an acute angle thereto, a transverse and horizontal guide-rod connected to the frame, a grooved pulley engaging therewith, stay-rods connected to the gate and extending through eyes upon the end of a pivoted hanger and connecting with the pulley, and operating-levers, and wires connected to the levers and connecting with the pulley, substantially as and for the purpose specified.

In testimony that I claim the above I have hereunto subscribed my name in the presence of two witnesses.

AUGUSTUS F. BRYA.

Witnesses:
FRED M. ZILLY,
FRANK WILCOX.